United States Patent [19]

Buzbee et al.

[11] 3,957,906

[45] May 18, 1976

[54] CHEMICALLY RESISTANT POLYESTER RESINS COMPOSITIONS

[75] Inventors: Lloyd R. Buzbee, Pittsburgh; Robert D. Lake, Monroeville, both of Pa.

[73] Assignee: Koppers Company, Inc., Pittsburgh, Pa.

[22] Filed: Sept. 12, 1974

[21] Appl. No.: 505,427

Related U.S. Application Data

[63] Continuation-in-part of Ser. No. 206,854, Dec. 10, 1971, abandoned.

[52] U.S. Cl. .............................. 260/861; 260/75 UA
[51] Int. Cl. ............................................. C08L 67/06
[58] Field of Search ..................... 260/861, 75 UA

[56] References Cited
UNITED STATES PATENTS

| | | | |
|---|---|---|---|
| 2,443,735 | 6/1948 | Kropa | 260/861 |
| 2,632,753 | 3/1953 | Anderson | 260/861 |
| 3,373,144 | 3/1968 | Janssen et al. | 260/872 |
| 3,435,094 | 3/1969 | Parker | 260/892 |
| 3,466,264 | 9/1969 | Hagemeyer et al. | 260/75 |
| 3,538,188 | 11/1970 | Fekete et al. | 260/865 |
| 3,814,724 | 6/1974 | Suzuki et al. | 260/40 R |
| 3,819,760 | 6/1974 | Aito et al. | 260/861 |

FOREIGN PATENTS OR APPLICATIONS

| | | |
|---|---|---|
| 801,122 | 12/1968 | Canada |
| 860,400 | 1/1971 | Canada |
| 1,419,760 | 10/1965 | France |
| 131,512 | 12/1970 | Netherlands |

OTHER PUBLICATIONS

Church and Berenson, "Properties of Styrene–Polyester Copolymers", Ind. and Eng. Chem. 47, 2456–2462, (1955).
Boenig, "Unsaturated Polyesters", pp. 10–11, 35, 142–150 and 170–171, Elsevier, 1964.
Bockstahler et al., "Thermal Properties of Unsaturated Resins", Ind. & Eng. Chem. 46, 1639–1641, (1954).

*Primary Examiner*—Donald E. Czaja
*Assistant Examiner*—E. A. Nielsen
*Attorney, Agent, or Firm*—Synnestvedt & Lechner

[57] ABSTRACT

Cured polyester resin products having improved chemical resistance are prepared from a curable polyester resin comprising:

A. an ethylenically unsaturated polyester having: a molecular weight of about 1,000 to about 4,000; an acid number of no greater than about 30; and a fumarate/maleate weight proportion of at least about 80%/20%, said polyester being the polyesterification reaction product of fumaric acid or maleic anhydride or mixture thereof and an acyclic glycol having a molecular weight of no greater than about 200 and an oxygen content of less than 42.6 wt. %; and B. a vinyl monomeric crosslinking agent in an amount such that the molar ratio of the ethylenic reactive unsaturation in said crosslinking agent to the ethylenic reactive unsaturation of said polyester is at least about 3 to 1, and wherein at least 50 wt. % of said crosslinking agent is styrene; and wherein said polyester is capable of being dissolved by said crosslinking agent at room temperature to form therewith a substantially homogeneous liquid solution.

31 Claims, No Drawings

CHEMICALLY RESISTANT POLYESTER RESINS COMPOSITIONS

CROSS-REFERENCE TO RELATED APPLICATION

This is a continuation-in-part of application Ser. No. 206,854, filed Dec. 10, 1971, now abandoned.

FIELD OF THE INVENTION

This invention relates to unsaturated polyesters, to polymerizable compositions containing said polyesters and a vinyl monomeric crosslinking agent, and to thermoset polymers prepared from the polymerizable compositions. More specifically, this invention relates to polymerizable polyester resin compositions which can be cured into thermoset articles having improved chemical resistance.

Unsaturated polyesters prepared by condensing an ethylenically unsaturated dicarboxylic acid (or anhydride thereof), a dihydric alcohol and, optionally, a saturated dicarboxylic acid) or anhydride thereof) are well known. Such polyesters can be reacted or cured with a vinyl monomeric crosslinking agent, such as styrene, and formed into articles which have generally good physical and electrical properties and good chemical resistance and weathering characteristics. Fibrous reinforcements, such as glass fibers, are added usually to the polymerizable composition for the purpose of improving the strength of articles made therefrom.

Although articles made from the more abundantly used polyesters, often referred to as general purpose polyester resins, have generally good properties as described above, there are applications for which it is desired that the cured article excel in certain properties. And it is known that articles with particularly good properties of one specific type or another can be prepared by utilizing polyester resins that have been prepared from particular ingredients.

Experience has shown that articles made from the more abundantly used general purpose polyester resins have a tendency to degrade when subjected for relatively long periods of time, particularly at elevated temperatures, to various chemicals such as hydrocarbons and aqueous alkali or acidic solutions (for example, NaOH, HCl, $H_2SO_4$, $Na_2CO_3$ or $HNO_3$). The degradation is particularly severe in the presence of aqueous solutions of alkali and aqueous solutions of oxidizing agents at elevated temperatures, for example, temperatures close to 100°C or higher.

The degradation, which is believed to be a chemical modification of the polymeric chains comprising the cured polyester resin, affects adversely the mechanical, electrical and other properties of the plastic article. Such degradation tends to limit the use of polyester resins for preparing articles, such as storage tanks, fume hoods, and pipes, which are exposed for relatively long periods to chemicals such as those mentioned above.

REPORTED DEVELOPMENTS

Various studies have been made from which some general conclusions have been drawn respecting the various properties of cured polyester resins. For example, it is disclosed in "Properties of Styrene-Polyester Copolymers" by Church and Berenson, *Industrial and Engineering Chemistry*, Vol. 47, No. 12; pages 2456–2462, December 1955, that cured polyester resins have a greater resistance to attack by solvents and chemical reagents the higher the styrene content of the cured polymer; also that cured polyester resins made from higher acid number polyesters had a marked decrease in chemical resistance. These conclusions were drawn from experiments in which there was used a polyester prepared from maleic anhydride and triethylene glycol and having an acid number within the range of 25 to 100, and cured with 8 to 31 wt. % styrene.

It has been reported also that styrene is more reactive with fumaric acid units than with maleic acid units and that polyesters containing fumaric acid are crosslinked more firmly than those containing maleic acid.

Various of the commercially available polyester resins which are curable into thermoset articles having relatively high chemical resistance include styrene and polyesters prepared by reacting maleic anhydride or fumaric acid with a very high molecular weight cyclic glycol, such as propoxylated bisphenol-A (Mol. wt.-344) or a hydrogenated bisphenol-A (Mol. wt.-206) or with a mixture of said cyclic glycols. These very high molecular weight cyclic glycol reactants are relatively expensive and accordingly the resultant polyesters are relatively expensive also. Furthermore, problems are encountered in the preparation and use of such polyesters. Polyesters prepared from such high molecular weight cyclic glycols have very high viscosities at polyesterification temperatures; this makes their manufacture difficult in conventional commercial equipment. Because of their extremely high viscosities, these molten polyesters cannot be added directly from the reactor to styrene or other crosslinking agent, as is conventionally done with other polyesters. Styrene solutions of these polyesters are prepared by cooling and pulverizing the polyester prior to its addition to styrene. Also, polyester resins based on propoxylated bisphenol-A cure relatively slowly and polyester resins based on either or both of the aforementioned cyclic glycols are relatively brittle.

In view of the above, it is an object of this invention to provide polyesters and curable polyester resins which can be formed into articles having improved chemical resistance.

BRIEF DESCRIPTION OF THE INVENTION

In accordance with this invention it has been found that cured or thermoset polyester resin products having improved chemical resistance can be prepared from curable polyester resins containing a crosslinking agent and a polyester having a combination of molecular weight, acid number, and fumarate/maleate ratio which fall within certain specified ranges, and wherein the amounts of crosslinking agent present in the composition fall within a specified range, and wherein the polyester is capable of being dissolved by said crosslinking agent at room temperature to form therewith a substantially homogeneous liquid solution. Improved chemically resistant thermoset polyester resins can be prepared from a curable polyester resin comprising:

A. an ethylenically unsaturated polyester having; a molecular weight of about 1,000 to about 4,000; an acid number no greater than about 30; and a fumarate/maleate weight proportion of at least about 80%/20%; said polyester being the polyesterification reaction product of fumaric acid or maleic anhydride or mixture thereof and an acyclic glycol having a molecular weight of no greater than about 200 and an oxygen content of less than 42.6 wt. %;

B. a vinyl monomeric crosslinking agent in an amount such that the molar ratio of the ethylenic reactive unsaturation in said crosslinking agent to the ethylenic reactive unsaturation of said polyester is at least about 3 to 1, and wherein at least 50 wt. % of said crosslinking agent is styrene; and wherein said polyester is capable of being dissolved by said crosslinking agent at room temperature to form therewith a substantially homogeneous liquid solution.

A preferred curable polyester resin composition within the scope of this invention is one in which the polyester has a molecular weight of about 2,000 to about 3,500, an acid number of about 5 to about 15 and a fumarate/maleate weight proportion of at least about 90%/10% and wherein the styrene crosslinking agent is present in an amount such that the molar ratio of said styrene to the ethylenic reactive unsaturation of said polyester is at least about 3 to 1 and most preferably within the range of about 3 to 1 to about 5 to 1.

From the standpoint of overall good functional properties, including good chemically resistant properties, and economics, including cost of raw materials and preparation, the following curable polyester resin composition is most preferred:

A. a polyester prepared from dipropylene glycol and either maleic anhydride or fumaric acid or mixtures thereof and having a molecular weight within the range of about 2,000 to about 3,500, an acid number of about 5 to about 15 and a fumarate/maleate weight proportion of about 90%/10% to about 100%/0%; and B. styrene in an amount such that the molar ratio of said styrene to the ethylenic reactive unsaturation of said polyester is within the range of about 3 to 1 to about 5 to 1.

Curable polyester resins in accordance with this invention have many advantages over those used presently in applications which require that the cured polyester resin have especially good chemical resistant properties. The polyesters used in the curable resins of the present invention can be prepared from readily available and relatively inexpensive low molecular weight glycols. As mentioned hereinabove, polyesters used presently to prepared products which are exposed to chemically degrading materials are made from very high molecular weight cyclic polyols which are relatively costly. The compositions of the present invention can be used to prepare cured articles which can have, not only, good chemical resistant properties, but also, a good combination of mechanical properties such as flexural, tensile, compressive and impact properties. Other advantages afforded by the present invention are the resins comprise a relatively high amount of low cost styrene and are cured readily at room temperature or elevated temperatures. Also the polyesters of the present invention have relatively low viscosities at conventionally used polyesterification temperatures; this simplifies the polyesterification. Such relatively low viscosity polyesters can be added in liquid form to the crosslinking agent, thereby avoiding the steps of cooling to room temperature and grinding required for presently used highly chemically resistant polyesters.

It will be appreciated from the detailed description of the invention which follows that the present invention can be used to provide polyester resins which can be cured into products which have a chemical resistance equal to or substantially above the chemical resistance of products made from the most widely used "chemically resistant" polyester resins presently available. Furthermore, the present invention can be used to provide polyester resins which can be cured into products which have intermediate levels of chemical resistance, but levels which are greater than those normally associated with heretofor known similar types of polyester resins.

DETAILED DESCRIPTION OF THE INVENTION

The polyesters of the present invention are prepared by reacting substantially equimolar quantities of an acyclic glycol having a molecular weight of no greater than about 200 and an oxygen content of less than 42.6 wt % with either maleic anhydride, fumaric acid or mixture thereof. However, monobasic and/or other polybasic acids can be substituted for a portion of the maleic anhydride or fumaric acid in order to achieve certain desired effects and/or to produce a polyester from which there can be prepared products which, in addition to having good chemically resistant properties, have also other high performance characteristics. Said other polybasic acids can be ethylenically unsaturated polybasic acids or anhydrides other than maleic anhydride or fumaric acid, and/or saturated polybasic acids. Such polybasic acids can be dibasic acids or acids having acid functionality greater than two. For any specific performance characteristic, the polybasic acid substituted for a portion of the maleic anhydride or fumaric acid can be selected in accordance with known technology. For example, saturated dibasic acids can be used to improve the flexibility of the thermoset products. Halogenated dibasic acids can be used to improve fire retardancy of the cured product and long chain acyclic dibasic acids can be used to improve the thermal stability of the cured polyester resins. Also, higher polybasic acids such as trimellitic acid and pyromellitic acid can be used in general to more readily achieve polyesters of relatively high molecular weight.

In preparing the polyesters, the maleic anhydride or fumaric acid reactant should comprise at least about 80 mole % of the acid reactant in the polyesterification reaction. Thus, up to about 20 mole % of an acid other than maleic anhydride or fumaric acid can be used in preparing the polyesters. Larger amounts of the substituted acid should not be used because of their general adverse affect on the chemical resistant properties of the cured resin.

As mentioned above, the polyesters used in the composition of the present invention must be capable of being dissolved at room temperature (about 60° to about 80°F) by the crosslinking agent to form therewith a substantially homogeneous liquid solution. If the polyester does not have such solubility characteristics, there will be obtained a two-phase mixture, that is, the polyester will be incompatible with the crosslinking agent. This creates numerous problems. For example, curing such a 2-phase mixture results in products which have not only relatively poor chemical resistance, but also other inferior properties. While it is possible that such two-phase mixtures can be converted to homogeneous liquid solutions by heating the mixture until the polyester dissolves in the crosslinking agent, this has the decided disadvantage that heat must be used to accomplish this. In many applications where chemically resistant polyester resins are used, such heating would be impractical, if not impossible. When heat is used to cure or accelerate the cure of polyester resins, the elevated curing temperatures may not be sufficient to convert the two-phase mixture into a homogeneous liquid solution. Other serious disadvantages of utilizing a polyester which is not capable of being dissolved in the crosslinking agent at room temperature are problems encountered in storing, shipping and handling such incompatible mixtures.

The polyesters which meet the above-described solubility characteristics are solid or liquid amorphous polyesters, preferably liquid polyesters. The amorphous polyesters are distinguished from crystalline polyesters which are solid and insoluble in the crosslinking agent at room temperature. Amorphous and crystalline polyesters are of course well known, as are methods for preparing them. Polyesters which are partially crystalline are well known also. The polyester used in the present invention can be partially crystalline in structure, but only to the extent that it will form a homogeneous liquid solution with the crosslinking agent at room temperature.

As mentioned above, polyols which are used to prepare the polyesters for use in this invention are acyclic glycols which have a molecular weight of no greater than about 200. Within this group of glycols, care must be exercised in avoiding the use of glycols which will result in a polyester which does not have the desired solubility characteristics described above. For example, it is known that crystalline polyesters are generally made from symmetrical diols such as, for example, 1,4-butanediol, 1,6-hexanediol, neopentyl glycol and dibromoneopentyl glycol. The use of such symmetrical glycols in preparing polyesters which contain a relatively high fumarate structure, as present in the polyesters of the present invention, will tend to produce a solid crystalline polyester. Upon combining small particles of the solid crystalline polyester with the crosslinking agent at room temperature, there is obtained a two phase composition in which the solid particles are dispersed in the liquid crosslinking agent. Speaking generally, a liquid solution of the aforementioned ingredients can be obtained by heating the two phase composition. However, upon cooling the solution to room temperature, there will again be obtained said two phase composition. This is undesirable as mentioned above.

As is known, different factors have a bearing on whether the reactants used in preparing polyesters will result in the production of amorphous, crystalline or partially crystalline polyesters, such factors including, for example, the specific concentration of the fumarate structure in the polyester, the specific amount and particular symmetrical diol used and the presence or absence of saturated dibasic acids, including the particular dibasic acid or acids that may be used and the amounts thereof. In general, the higher the proportion of fumarate in the polyester, the more the likelihood that the polyester will be crystalline. On the other hand, and generally speaking, the higher the proportion of saturated dibasic acid in the polyester, the less the tendency of the polyester to assume a crystalline structure. It is known also that the polyesterification reaction conditions used can have an influence on whether amorphous, crystalline or partially crystalline polyesters are obtained. In addition, it is known that the use of a mixture of 2 or more different symmetrical glycols can be used to prepare a polyester having the desired solubility characteristics notwithstanding that the use of but one of the symmetrical glycols would in general produce a crystalline or partially crystalline polyester which does not have the desired solubility characteristics. Following the knowledge of the art, symmetrical glycols can be used to prepare polyesters for use in the present invention, but they should be used as blends of two or more symmetrical glycols which result in polyesters having the desired solubility characteristics or they should not be used in amounts which result in the production of crystalline polyesters or partially crystalline polyesters which do not have the desired solubility characteristics described above. In general, if symmetrical glycols are used, they should be used in combination with other polyols such as cyclic polyols or asymmetrical acyclic polyols, including those having a molecular weight of under or above 200, or as blends of two or more symmetrical glycols which give a polyester having the desired solubility characteristics.

A group of glycols which should not be used as the sole glycol reactant are those which have a relatively high proportion of oxygen in the molecule. These glycols include, for example, ethylene glycol and ethers of ethylene glycol such as diethylene glycol and triethylene glycol, the last mentioned having an oxygen content of 42.6 wt. %, with diethylene glycol and ethylene glycol having even greater proportions of oxygen in the molecule. Polyesters which contain such glycols as the only polyol in its structure tend to lack the desired solubility characteristics described above. For example, polyesters containing such glycols as the only polyol in its structure can be liquids which at room temperature are immiscible with the crosslinking agent, forming therewith a two-phase liquid mixture rather than a homogeneous liquid solution. It is believed, but not confirmed, that the high polarity of such glycols leads to the two-phase composition. While such glycols can be used in combination with other polyols to prepare the polyesters, they should comprise no more than 50 mole % of the polyol reactant, and preferably not more than 25 mole % of the polyol reactant.

Preferred glycols for preparing amorphous polyesters which have the desired solubility characteristics are propylene glycol, dipropylene glycol, tripropylene glycol, 1,3-butanediol, and 2,2,4-trimethylpentane-1,3-diol. These glycols can be used as the sole polyol reactant or in combination with symmetrical glycols, ethylene glycol and ethers thereof, and other polyols described below. The preferred glycols are asymmetrical and have an oxygen content of less than 42.6%. Polyesters with the desired solubility characteristics can be readily made from the preferred glycols and their use results in cured products having improved chemical resistance. Mixtures of the aforementioned acyclic glycols can be used. Also halogenated derivatives of said acyclic glycols can be used to impart improved fire retardant properties to the cured product.

In addition, it should be understood that cyclic or higher molecular weight glycols or any polyol containing more than two hydroxy groups can be substituted for a portion of the lower molecular weight acyclic glycol for the purpose of obtaining desired effects or a desired combination of properties for specific applications, including properties such as fire retardancy, electrical, mechanical, thermal resistance, chemical resistance, compatability with vinyl monomers and suitable viscosity with vinyl monomers, etc. Examples of polyols which can be substituted for the low molecular weight acyclic glycols are hydrogenated bisphenol-A, propoxylated bisphenol-A, cyclohexanedimethanol, propoxylated tetrabromobisphenol-A and 4,4/-(bis-2 hydroxyethylamino)-octochloro-biphenyl. Also, polyols such as trimethylolpropane and pentaerythritol can be used in some applications to more readily achieve polyesters of relatively high molecular weight.

Also, minor amounts, for example, up to about 20 mole % of a monofunctional alcohol can be used in the preparation of the polyester to obtain desired effects. The use of monofunctional alcohols in preparing polyesters is well recognized.

In preparing the polyesters, the lower molecular weight acyclic glycol reactant should comprise at least about 50 mole % of the alcoholic reactant in the polyesterification reaction. Thus, up to about 50 mole % of another type of polyol can be used in preparing the polyester, provided that the amount used does not adversely affect the desired solubility characteristics of the polyester. Larger amounts of the substituted alcohol should not be used because, depending on the particular substituted alcohol, there will be a tendency to encounter various problems, for example, the polyesters may be too highly viscous at the polyesterification temperatures or undesired crosslinking may occur or desired properties of the cured article may be adversely affected. Furthermore, the use of larger amounts of such alcohols will increase the cost of the polyesters.

The polyesters used in the present invention can be prepared according to available polyester reaction techniques. In accordance with available techniques, the reaction should be conductd under conditions which will produce a polyester having a molecular weight within the range of about 1,000 to about 4,000 and preferably about 2,000 to about 3,500. Similarly, the reaction conditions should be controlled so that the polyester has an acid number of no greater than about 30 and preferably about 5 to about 15.

With respect to molecular weight of the polyester, it is noted that cured products prepared from a polyester having a molecular weight below about 1,000 generally have poor overall properties. The mechanical and chemically resistant properties of cured products increase as the molecular weight of the polyester is increased. However, as the molecular weight is increased, the viscosity of the polyester becomes increasingly high. At viscosities of about 200 to about 500 poises, the polyester is difficult to handle in conventional commercial reaction equipment. In general, such viscosities are reached when the molecular weight of the polyesters of this invention is about 4,000 and higher. Thus, the improved mechanical and chemically resistant properties that are realized with such high molecular weight polyesters are counterbalance by difficulties in handling the high viscosity materials. An overall good combination of properties can be obtained with polyesters having a molecular weight within the preferred range, namely about 2,000 to about 3,500.

The acid number of the polyester should be no greater than about 30 and desirably much lower. The lower the acid number of the polyester, the better the chemical resistant properties of cured articles made therefrom. However, the advantages of attaining such properties are counterbalanced by the disadvantages which are inherent in producing on a commercial scale a polyester having an acid number which approaches zero and a molecular weight in excess of about 3,500. Using current commercial techniques, and speaking generally, relatively very long reaction periods would be required to produce polyesters having acid numbers well below 5 and molecular weight above 3,500. For example, if an 8 hour reaction time were required to prepare a polyester having an acid number of 30 and a molecular weight of 1,000, a reaction period of 20–40 hours would be expected in order to prepare the polyester at an acid number well below 5 and at a molecular weight above 3,500. There is also a tendency for polyesters to crosslink and become styrene insoluble when forced to such high molecular weights and low acid numbers. In light of this and in accordance with this invention, it has been found that a good balance between economies of preparation of the polyester and improved chemically resistant properties of articles made therefrom can be realized when the polyester has an acid number and molecular weight within the preferred ranges of about 5 to about 15 and about 2,000 to about 3,500 respectively. However, it should be understood that polyesters having an acid number below about 5 and a molecular weight in excess of about 3,500 can be used to produce products with still better chemically resistant properties, other variables held constant.

As mentioned hereinabove the acid reactant used to prepare the polyesters must include at least about 80 mole % of maleic anhydride, fumaric acid or mixtures thereof. In accordance with this invention, the molar ratio of fumarate to maleate should comprise at least about 80% fumarate. Thus, the molar proportion of fumarate/maleate should be at least about 80%/20%. The chemically resistant properties of the cured product are higher, the higher the fumarate content of the polyester. Thus, ideally, the fumarate content of the polyester should be 100%. Polyesters having a fumarate content of 100% can be prepared by utilizing as the acid reactant fumaric acid exclusively. From an economical standpoint, this may be unattractive because at present day prices, fumaric acid is more costly than maleic anhydride.

However, a good balance between economies of raw materials and good chemically resistant properties can be achieved by utilizing maleic anhydride in the polyesterification reaction. This is because the polyesterification reaction conditions can be controlled according to available techniques in a manner such that the polyesters produced usually contain about 75% to about 90% of fumarate as a result of the isomerization of the maleate structure. (It is noted that maleic acid and fumaric acid are cis-trans isomers.) Speaking generally, the reaction conditions used to accomplish this are conventional solvent-free polyesterification conditions.

It is known also that the polyesters containing a fumarate/maleate molar proportion of greater than 85%/15% and approaching 100%/0% can be prepared from maleic anhydride by incorporating in the polyesterification reaction mixture catalysts which isomerize effectively the maleate structures. Examples of such catalysts include acids, (particularly the halogen acids or materials which decompose to form such acids, for example, polyvinyl chloride), ureas, thioureas, carbamates, thio- and dithiocarbamates, and amines. The catalysts can be used in catalytic amounts, for example about 0.1% to about 5% based on the weight of the polyester, amounts which are known in the art.

Other variables held constant, the chemically resistant properties of products prepared from polyesters in which the fumarate/maleate molar proportion is below about 80%/20% tend to be lower than that required for many applications. It is preferred that said proportion be at least about 90%/10%; cured products with excellent resistance to chemical attack can be prepared from such polyesters.

In accordance with this invention, the ethylenically unsaturated polyesters described above are combined with styrene alone or in admixture with another vinyl monomeric crosslinking agent for the polyesters. When styrene is combined with another crosslinking agent, the total weight of the crosslinking agents should comprise at least about 50 wt. % styrene. The crosslinking agent must be present in an amount such that the molar ratio of the ethylenic reactive unsaturation in the crosslinking agent to the ethylenic reactive unsaturation in the polyesters is at least about 3 to 1. The "ethylenic reactive unsaturation" of the crosslinking agent and the polyester refers to the unsaturation in each of these materials which is capable of reacting with each other. As this molar ratio is increased, there is a tendency for the chemically resistant properties of the cured product to increase gradually as the ratio approaches a value of about 3 to 1; however, at a value of about 3 to 1 and higher, the chemically resistant properties of the cured product increase dramatically. As the amounts of crosslinking agent in the curable polyester resins are increased to an extent that the aforementioned molar ratio is greater than about 5 to 1, the chemically resistant properties of the cured properties continue to increase but to a lesser extent than when the said molar ratio is between about 3 to 1 and about 5 to 1. Thus, it is preferred that the molar ratio of the ethylenic reactive unsaturation of the crosslinking agent to ethylenic reactive unsaturation in the polyester be between about 3/1 and about 5/1. Other reasons for maintaining said ratio in the preferred range are: as the ratio exceeds about 5/1, the viscosity of the curable resin becomes quite low; this can make the composition difficult to handle in preparing certain types of products; in addition, the rate of cure of the curable resin become relatively slow.

As mentioned above, a portion of the styrene crosslinking agent can be substituted with other vinyl monomeric crosslinking agents which, it is noted, contain the $CH_2=C<$ group. It is advantageous to do this when it is desired to impart specific properties or upgrade certain properties of the cured product. Examples of other crosslinking agents include chlorostyrene, vinyltoluene, methyl methacrylate and divinylbenzene. However, styrene should comprise at least about 50 wt. % of the crosslinking agent used.

The amount of ethylenically reactive unsaturation present in the polyester can be determined conveniently by the nuclear magnetic resonance technique; this technique can be used also to determine quantitatively maleate and fumarate unsaturation.

For some curing and molding applications, it may be found desirable to increase the viscosity of the curable resin to faciliate handling. This can be done conveniently by adding to the curable resin relatively small amounts of chemical thickening agents and fillers. Examples of such materials, which are known to those skilled in the art, are oxides and hydroxides of calcium and magnesium, talc, alumina, silicates and calcium carbonate. Exemplary amounts of chemical thickening agents and fillers which can be used to increase the viscosity of the curable resin are about 0.02 to about 5 wt. % and about 10 to about 70 wt. % respectively. It should be understood that the specific amount used will depend on the particular thickening material used and the extent to which it is desired to increase the viscosity of the curable resin. It is noted also that conventional amounts of fumed silica or asbestos can be used to thicken resins when high levels of thixotropy are desired or where they are not troublesome.

As mentioned above, a very much preferred composition which has been developed in accordance with the present invention comprises the following: (A) a polyester prepared from dipropylene glycol and either maleic anhydride or fumaric acid or mixtures thereof and having a molecular weight of about 2,000 to about 3,500, an acid number of about 5 to about 15 and a fumarate/maleate weight proportion of about 90%/10% to about 100%/0%; and (B) styrene in an amount such that the molar ratio of said styrene to the ethylenic reactive unsaturation of said polyester is within the range of about 3/1 to about 5/1. Desirable characteristics of the above curable resin include: ease of preparation; low cost of raw materials; curing characteristics which enable the cured products to be prepared in a relatively short time; and ease of thickening to conventional viscosity levels. Most important, the above curable resin can be polymerized into products which have extremely good mechanical and chemically resistant properties.

In accordance with available technology there can be included in the composition of this invention initiators or catalysts, accelerators or promotors, and crosslinking and stabilizing inhibitors. Examples of such materials include t-butyl perbenzoate, t-butylhydroperoxide, hydroquinone, t-butylcatechol, cobalt naphthenate, diethyl aniline and dimethyl aniline.

Other materials which are generally incorporated into polymerizable unsaturated polyester resin formulations can be added to the composition of this invention. Thus, fillers, pigments, mold release additives, thermoplastic resins and fibrous reinforcements, including glass fibers, can be added to the composition of this invention in accordance with available technology.

The curable polyester resin can be polymerized or cured into articles according to any of the available techniques. For example, vacuum and pressure bag techniques can be used, or the articles can be made in a matched-metal mold utilizing premix or wet lay-up techniques. In addition, articles can be made by the pultrusion technique. Also, the curable resin can be thickened with chemical thickening agents and formed into thickened resin mats or prepregs which can be shaped and molded into cured products.

EXAMPLES

Examples which follow are illustrative of the practice of this invention. Comparative examples are set forth also.

The Examples set forth in Table 1 below illustrate the extent to which the molar ratio of styrene to ethylenic reactive unsaturation of the polyester influences the flexural properties of cured products prepared from curable polyester resins after the products were exposed to tests designed to evaluate the chemical resistance of the products. The test utilized consisted of exposing test specimens to a boiling aqueous solution of 20 wt. % ethanolamine for the time periods set forth in Table 1. The evaluation of the test specimens consisted of determining the % of flexural properties retained by the specimen after exposure to the test. The greater the % of flexural properties retained, the better the chemical resistance thereof.

The castings of Example Nos. 1–19 were prepared by adding to the curable resin 1.5 wt. % benzoyl peroxide powder and 0.2 wt. % N,N-diethylaniline, each based on the weight of the resin solution. The resin solution was degassed and placed between two glass plates which were coated with a mold release material. The test specimens were cured for 16 hours at room temperature, for 0.5 hour at 80°C, for 1 hour at 175°C. All of the test castings were 8 inches × 8 inches × 1/8 inch. The molar ratio of styrene to ethylenic reactive unsaturation of the polyester for all of the examples was calculated based on the amount of materials charged to the polyesterification reaction mixture, assuming no loss during reaction. The maleate/fumarate ratios were determined by standard nuclear magnetic resonance technique.

Table 1

| | Curable Polyester Resin | | | | | | Chemical Resistance of Cured Polyester Resin Flexural Properties Retained After Test Exposure | |
|---|---|---|---|---|---|---|---|---|
| | Polyester | | | | | | | |
| Ex. No. | Identity | M.Wt. | Acid No. | Fumarate Maleate | Styrene Wt.% | Styrene Reactive Unsaturation | Days of Test Exposure | % Strength | % Modulus |
| 1 | MA-PG(1) | 2190 | 23.4 | 96/4 | 60 | 2.3 | 8 | 13 | 69 |
| 2 | " | " | " | " | 70 | 3.5 | 8 | 96 | 85 |
| 3 | MA-DPG(2) | 2890 | 5.6 | 82/18 | 40 | 1.4 | 3 | 38 | 81 |
| 4 | " | " | " | " | 50 | 2.1 | 3 | 16 | " |
| 5 | " | " | " | " | 60 | 3.1 | 9 | 52 | 78 |
| 6 | " | " | " | " | 70 | 4.8 | 33 | 66 | 88 |
| 7 | FA-DPG(3) | 3670 | 8.3 | 97/3 | 40 | 1.4 | 6 | 35 | 79 |
| 8 | " | " | " | " | 50 | 2.1 | 6 | 45 | 84 |
| 9 | " | " | " | " | 60 | 3.1 | 33 | 56 | 91 |
| 10 | " | " | " | " | 70 | 4.8 | 33 | 102 | 100 |
| 11 | MA-DPG-NPG(4) | 2450 | — | 91/9 | 50 | 1.4 | 3 | 7.3 | 73 |
| 12 | " | " | — | " | 70 | 3.5 | 33 | 45 | 85 |
| 13 | MA-DPG-HBPA(5) | 2100 | 9.5 | 82/18 | 50 | 2.6 | 33 | 28 | 78 |
| 14 | " | " | " | " | 60 | 3.9 | " | 73 | 98 |
| 15 | "(6) | 2300 | 11 | 85/15 | 50 | 2.7 | 33 | 26 | 82 |
| 16 | " | " | " | " | 60 | 4.1 | " | 70 | 93 |
| 17 | MA-DPG-PBPA(7) | 2480 | 20.9 | 88/12 | 55 | 3.1 | 13 | 60 | 80 |
| 18 | " | " | " | " | 60 | 3.8 | 33 | 51 | 86 |
| 19 | " | " | " | " | 65 | 4.7 | " | 63 | 85 |

Polyester prepared by reacting:
(1)maleic anhydride with 3% molar excess of propylene glycol
(2)maleic anhydride with 1% molar excess of dipropylene glycol
(3)fumaric acid with 1% molar excess of dipropylene glycol
(4)equimolar amounts of maleic anhydride, dipropylene glycol and neopentyl glycol
(5)3 moles of maleic anhydride, 2 moles of dipropylene glycol and 1 mole of hydrogenated bisphenol-A
(6)2 moles of maleic anhydride, 1 mol of dipropylene glycol and 1 mole of hydrogenated bisphenol-A
(7)3.54 moles of maleic anhydride, 2.65 moles of dipropylene glycol and 1 mole of propoxylated bisphenol-A From the Examples of Table 1 above, it can be seen that the % of flexural properties retained by the test specimens that were prepared from curable resins in which the molar ratio of styrene/ethylenic reactive unsaturation was about 3/1 or higher (Example Nos. 2, 5, 6, 9, 10, 12, 14 and 16) were much greater than those prepared from curable resins in which said ratio was lower than about 3/1.

To further emphasize the criticality of having the molar ratio of styrene/reactive unsaturation in the curable resin above about 3/1, there is set forth in Table 2 below the absolute values of the flexural properties of the test specimens of Table 1 above after they were exposed to chemical resistance test described above. The flexural properties were determined in accordance with ASTM D-638.

Table 2

| Cured Polyester Resin | Styrene Reactive Unsaturation | Days of Test Exp. | Flexural Properties After Test Exposure Strength, psi | Modulus, psi |
|---|---|---|---|---|
| Ex. No. 1 above | 2.3 | 8 | 1,700 | 360,000 |
| Ex. No. 2 above | 3.5 | 8 | 12,888 | 410,000 |
| Ex. No. 3 above | 1.4 | 3 | 4,400 | 330,000 |
| Ex. No. 4 above | 2.1 | 3 | 2,000 | 340,000 |
| Ex. No. 5 above | 3.1 | 9 | 8,000 | 340,000 |
| Ex. No. 6 above | 4.8 | 33 | 11,100 | 390,000 |
| Ex. No. 7 above | 1.4 | 6 | 4,400 | 320,000 |
| Ex. No. 8 above | 2.1 | 6 | 5,000 | 370,000 |
| Ex. No. 9 above | 3.1 | 33 | 8,300 | 410,000 |
| Ex. No. 10 above | 4.8 | 33 | 16,200 | 450,000 |
| Ex. No. 11 above | 1.4 | 3 | 940 | 330,000 |
| Ex. No. 12 above | 3.5 | 33 | 7,400 | 390,000 |
| Ex. No. 13 above | 2.6 | 33 | 4,100 | 330,000 |
| Ex. No. 14 above | 3.9 | 33 | 11,500 | 410,000 |
| Ex. No. 15 above | 2.7 | 33 | 4,000 | 360,000 |
| Ex. No. 16 above | 4.1 | 33 | 10,900 | 410,000 |
| Ex. No. 17 above | 3.1 | 13 | 10,100 | 370,000 |
| Ex. No. 18 above | 3.8 | 33 | 8,500 | 360,000 |
| Ex. No. 19 above | 4.7 | 33 | 10,900 | 390,000 |

The examples in Table 2 illustrate strikingly the improved chemical resistant properties of cured products made from polyester resins within the scope of the present invention. For example, the cured product of Example No. 12, which was exposed to the boiling ethanolamine solution for 11 times longer than that of comparative Example No. 11 had, nevertheless, almost 8 times the strength of the cured product of Example No. 11.

As mentioned hereinabove, the viscosities of curable resins within the scope of this invention which have a relatively high molar ratio of styrene/ethylenically reactive unsaturation may tend to be lower than that desired for use in certain curing applications. The next group of examples, reported in Table 3 below, shows the thickening of such curable resins by the use of a chemical thickening agent. There is shown also in Table 3 below examples of compositions containing a thixotropic additive with and without a clay filler which compositions are within the scope of this invention. The polyester used in the examples of Table 3 was one prepared by reacting approximately equimolar amounts of maleic anhydride and dipropylene glycol. The polyester had a molecular weight of 3,140, an acid number of 7 and a fumarate/maleate proportion of 84%/16%. The polyester was combined with 70 wt. % styrene to give a styrene/reactive unsaturation molar ratio of 4.8. Test castings were made from the curable resin and their chemical resistance was evaluated by exposing them to a boiling solution of 20 wt. % ethanolamine for 33 days. The test castings were prepared by the procedure described for Example Nos. 1–19.

As exemplary of a polyester made from an acyclic polyester having a molecular weight of less than 200, but one which does not have the desired solubility characteristics, the following are presented. A polyester prepared from 0.8 mole of fumaric acid, 0.2 mole of succinic anhydride and 1.06 moles of diethylene glycol and having an acid number of 16.3 and a styrene solution viscosity (30 wt. % styrene) of 10 poise at 23°C was combined with 57.2 wt. % styrene (ethylenic unsaturation ratio being 3 to 1). A 2-phase composition of Table 3

| Ex. No. | Chemical Thickening Agents and Fillers | Viscosity at 25°C, poises | Strength psi | % Strength Retained | % Modulus Retained |
| --- | --- | --- | --- | --- | --- |
| | Chemical Resistance of Cured Polyester Resin-Flexural Properties Retained after Test Exposure | | | | |
| 20 | — | 0.3 | 14,300 | 82 | 98 |
| 21 | 3 wt. % colloidal silica (1) | 3.9 | 13,600 | 76 | 82 |
| 22 | 0.06 wt. % MgO; 0.006 wt. % Mg(OH)$_2$ & 0.11 wt. % H$_2$O | 29 | 14,500 | 83 | 84 |
| 23 | 1.9 wt. % colloidal silica and 35 wt. % Kaolin clay (2) | 8.0 | 7,000 | 71 | 65 |
| 24 | 0.5 wt. % colloidal silica & 49.4 wt. % Kaolin clay | 15.0 | 6,800 | 76 | 61 |

(1) Cab-O-Sil Grade EH-5 sold by Godfrey L. Cabot, Inc.
(2) ASP-400 sold by Minerals & Chemicals Philipp Corporation Further evidence of the excellent chemical resistance of cured products made from polyester resins of the present invention is exhibited by subjecting such products to one year testing at a temperature of 100°C to chemical media such as: 5% nitric acid; 25% acetic acid; 25% sulfuric acid; 15% hydrochloric acid; 5% sodium hydroxide; 10% sodium hydroxide; 5% sodium hydrochlorite; 5% of alkaline detergent; demineralized water; and air.

In this connection, cured products made from a polyester resin commposition within the scope of the present invention were subjected to one year long testing in many of the chemical media mentioned above at temperatures of 96°–98°C, and their chemical resistance was compared to a heretofore known commercially available polyester resin composition of the type mentioned above, that is, one containing a very high molecular weight cyclic glycol (see U.S. Pat. No. 2,634,251). The polyester used in the composition of the present invention was prepared from dipropylene glycol and had an average molecular weight of 3,670, an acid number of 8.3, and a fumarate to maleate weight proportion of 97%/3%. This polyester was combined with 70 wt. % styrene. The molar ratio of the ethylenic reactive unsaturation of the styrene to that of the polyester was 4.8. The commercially available comparative polyester resin composition contained a polyester made from propoxylated bisphenol-A and it had an average molecular weight of 2600, an acid number of 13 and a fumarate/maleate weight proportion of 98%/2%. The commercially available resin comprised 50 wt. % styrene. The molar ratio of the ethylenic reactive unsaturation of the styrene to that of the polyester was 4.1. One year comparative testing showed that the chemically resistant properties of the resin within the scope of the present invention were overall at least comparable to those of the aforementioned commercially available resins.

two immiscible liquids was obtained at room temperature. This mixture had to be heated to 55°–60°C before a homogeneous liquid solution was obtained. On cooling to room temperature, a two-phase composition was again obtained. Another polyester made from 0.9 mole of fumaric acid, 0.1 mole of succinic anhydride and 1.06 mole of diethylene glycol and having an acid number of 14 and a styrene solution viscosity (30 wt. % styrene) of 11 poise at 23°C was combined with 61.2 wt. % styrene (ethylenic unsaturation ratio being 3 to 1). A two-phase composition consisting of two immiscible liquids was obtained. The composition had to be heated to 60°–65°C in order to obtain a homogeneous liquid solution. On cooling to room temperature, a two-phase composition was again obtained. Problems of the type mentioned above are encountered when polyesters having such undesirable solubility characteristics are used.

Polyester resins within the scope of the present invention can be molded and cured according to available techniques into articles which are exposed to materials which tend to degrade polyester resins. Examples of such articles include storage tanks, fume hoods and pipes which are subjected for relatively long periods of time to chemical degrading materials. Examples of additional articles include washing machine parts, components of dishwashers and, in general, chemical processing equipment.

Polyester resins are used in an extremely wide diversity of applications. These applications require a complete spectrum of levels of chemical resistance. Often for a specific application, a particular polyester resin would be satisfactory if a significant improvement in chemical resistance could be achieved. Such improvements can be obtained by the practice of the present invention. By the practice of this invention, it should often be possible to achieve required chemical resis-

We claim:

1. A curable polyester resin composition for preparing thermoset articles having improved chemically resistant properties comprising:
    A. an ethylenically unsaturated polyester having a molecular weight of about 1,000 to about 4,000; an acid number of no greater than about 30; *and a fumarate to maleate weight proportion of at least about* 80%/20%; said polyester being the polyesterification product of fumaric acid or maleic anhydride or mixtures thereof and an acyclic glycol having a molecular weight of no greater than about 200 and an oxygen content of less than 42.6 wt. %, wherein the amount of said fumaric acid or maleic anhydride is at least about 80 mole % of the acid reactant used to prepare said polyester and wherein the amount of said acyclic glycol is at least about 50 mole % of the polyol reactant used to prepare said polyester; and
    B. a vinyl monomeric crosslinking agent in an amount such that the molar ratio of the ethylenic reactive unsaturation in said crosslinking agent to the ethylenic reactive unsaturation of said polyester is between about 3 to 1 and about 5 to 1, and wherein at least 50 wt. % of said crosslinking agent is styrene;

and wherein said polyester is capable of being dissolved by said crosslinking agent at room temperature to form therewith a substantially homogeneous liquid solution.

2. A thermoset article prepared from the resin composition of claim 1.

3. A resin composition according to claim 1 wherein said acyclic glycol is an asymmetrical glycol.

4. A resin composition according to claim 3 wherein said acyclic asymmetrical glycol is selected from the group consisting of propylene glycol, dipropylene glycol, tripropylene glycol, 1,3-butane diol and 2,2,4-trimethylpentane-1,3-diol, and mixtures thereof.

5. A resin composition according to claim 1 wherein said polyol reactant includes no more than about 50 mole % of a polyol selected from the group consisting of hydrogenated bisphenol-A, propoxylated bisphenol-A, cyclohexanedimethanol, propoxylated tetrabromobisphenol-A and 4,4/-(bis-2 hydroxyethylamino)-octochlorobiphenyl and mixtures thereof.

6. A resin composition according to claim 3 wherein said polyol reactant includes no more than about 50 mole % of a polyol selected from the group consisting of hydrogenated bisphenol-A, propoxylated bisphenol-A, cyclohexanedimethanol, propoxylated tetrabromobisphenol-A and 4,4/-(bis-2 hydroxyethylamino)-octochlorobiphenol and mixtures thereof.

7. A resin composition according to claim 4 wherein said polyol reactant includes no more than about 50 mole % of a polyol selected from the group consisting of hydrogenated bisphenol-A, propoxylated bisphenol-A, cyclohexanedimethanol, propoxylated tetrabromobisphenol-A and 4,4/-(bis-2 hydroxyethylamino)-octochlorobiphenyl and mixtures thereof.

8. A resin composition according to claim 1 wherein said acyclic glycol is a mixture of two or more symmetrical glycols.

9. A resin composition according to claim 3 wherein said polyol reactant includes no more than about 50 mole % of a symmetrical glycol.

10. A resin composition according to claim 4 wherein said polyol reactant includes no more than about 50 mole % of a symmetrical glycol.

11. A resin composition according to claim 9 wherein said symmetrical glycol is selected from the group consisting of neopentyl glycol, 1,6-hexane diol, 1,4-butane diol and dibromoneopentyl glycol and mixtures thereof.

12. A resin composition according to claim 10 wherein said symmetrical glycol is selected from the group consisting of neopentyl glycol, 1,6-hexane diol, 1,4-butane diol and dibromoneopentyl glycol and mixtures thereof.

13. A curable polyester resin composition for preparing thermoset articles having improved chemically resistant properties comprising:
    A. an ethylenically unsaturated polyester having a molecular weight of about 2,000 to about 3,500; an acid number of about 5 to about 15; a fumarate to maleate weight proportion of at least about 90%/10%; said polyester being the polyesterification product of fumaric acid or maleic anhydride or mixture thereof and an acyclic glycol having a molecular weight of no greater than about 200 and an oxygen content of less than 42.6 wt. %, wherein the amount of said fumaric acid or maleic anhydride is at least about 80 mole % of the acid reactant used to prepare said polyester and wherein the amount of said acyclic glycol is at least about 50 mole % of the polyol reactant used to prepare said polyester; and
    B. styrene in an amount such that the molar ratio of said styrene to the ethylenic reactive unsaturation of said polyester is between about 3 to 1 and about 5 to 1;

and wherein said polyester is capable of being dissolved by said crosslinking agent at room temperature to form therewith a substantially homogeneous liquid solution.

14. A resin commposition according to claim 13 wherein said acyclic glycol is an asymmetrical glycol.

15. A resin composition according to claim 14 wherein said acyclic asymmetrical glycol is selected from the group consisting of propylene glycol, dipropylene glycol, tripropylene glycol, 1,3-butane diol, and 2,2,4-trimethylpentane-1,3-diol, and mixtures thereof.

16. A resin composition according to claim 13 wherein said polyol reactant includes no more than about 50 mole % of a polyol selected from the group consisting of hydrogenated bisphenol-A, prpoxylated bisphenol-A, cyclohexanedimethanol, propoxylated tetrabromobisphenol-A and 4,4/-(bis-2 hydroxyethylamin0)-octochlorobiphenyl and mixtures thereof.

17. A resin composition according to claim 14 wherein said polyol reactant includes no more than about 50 mole % of a polyol selected from the group consisting of hydrogenated bisphenol-A, propoxylated bisphenol-A, cyclohexanedimethanol, propoxylated tetrabromobisphenol-A and 4,4/-(bis-2 hydroxyethylamino)-octochlorobiphenyl and mixtures thereof.

18. A resin composition according to claim 15 wherein said polyol reactant includes no more than about 50 mole % of a polyol selected from the group consisting of hydrogenated bisphenol-A, proproxylated bisphenol-A, cyclohexanedimethanol, propoxylated tetrabromobisphenol-A and 4,4/-(bis-2 hydroxyethylamino)-octochlorobiphenyl and mixtures thereof.

19. A resin composition according to claim 13 wherein said acyclic glycol is a mixture of two or more symmetrical glycols.

20. A resin composition according to claim 14 wherein said polyol reactant includes no more than about 50 mole % of a symmetrical glycol.

21. A resin composition according to claim 15 wherein said polyol reactant includes no more than about 50 mole % of a symmetrical glycol.

22. A resin composition according to claim 20 wherein said symmetrical glycol is selected from the group consisting of neopentyl glycol, 1,6-hexane diol, 1,4-butane diol and dibromoneopentyl glycol and mixtures thereof.

23. A resin composition according to claim 21 wherein said symmetrical glycol is selected from the group consisting of neopentyl glycol, 1,6-hexane diol, 1,4-butane diol and dibromoneopentyl glycol and mixtures thereof.

24. A curable polyester resin composition for preparing thermoset articles having improved chemically resistant properties comprising:
   A. a polyester prepared from dipropylene glycol and either maleic anhydride or fumaric acid or mixtures thereof and having a molecular weight within the range of about 2,000 to about 3,500, an acid number of about 5 to about 15 and a fumarate/maleate weight proportion of about 90%/10% to about 100%/0%; and
   B. styrene in an amount such that the molar ratio of said styrene to the ethylenic reactive unsaturation of said polyester is within the range of about 3 to 1 to about 5 to 1;
and wherein said polyester is capable of being dissolved in said styrene at room temperature to form a substantially homogeneous liquid solution.

25. A thermoset article prepared from the resin composition of claim 24.

26. A thermoset article prepared from the resin composition of claim 13.

27. A thermoset article prepared from the resin composition of claim 15.

28. A resin composition according to claim 4 wherein the amount of said asymmetrical glycol is about 100 mole % of the polyol reactant used to prepare said polyester.

29. A resin composition according to claim 15 wherein the amount of said asymmetrical glycol is about 100 mole % of the polyol reactant used to prepare said polyester.

30. A resin composition according to claim 4 wherein said acyclic polyol is a halogenated derivative thereof.

31. A resin composition according to claim 15 wherein said acyclic polyol is a halogenated derivative thereof.

* * * * *